(12) United States Patent
Ananthapur Bache et al.

(10) Patent No.: US 10,171,862 B2
(45) Date of Patent: Jan. 1, 2019

(54) INTERACTIVE VIDEO SEARCH AND PRESENTATION

(71) Applicant: INTERNATIONAL BUSINESS MACHINES CORPORATION, Armonk, NY (US)

(72) Inventors: Vijay K. Ananthapur Bache, Bangalore (IN); Vijay Ekambaram, Chennai (IN); Sarbajit Rakshit, Kolkata (IN); Saravanan Sadacharam, Chennai (IN)

( * ) Notice: Subject to any disclaimer, the term of this patent is extended or adjusted under 35 U.S.C. 154(b) by 24 days.

(21) Appl. No.: 15/434,854

(22) Filed: Feb. 16, 2017

(65) Prior Publication Data

US 2018/0234718 A1    Aug. 16, 2018

(51) Int. Cl.
*H04N 5/445*  (2011.01)
*H04N 21/422*  (2011.01)
(Continued)

(52) U.S. Cl.
CPC ..... *H04N 21/42221* (2013.01); *G06F 3/0482* (2013.01); *H04N 21/42222* (2013.01); *H04N 21/4722* (2013.01)

(58) Field of Classification Search
CPC ....... H04N 21/42221; H04N 21/42222; H04N 21/4223; H04N 21/42204
See application file for complete search history.

(56) References Cited

U.S. PATENT DOCUMENTS 6,151,017 A * 11/2000 Suzuoka ............ G06F 3/04842
345/157

6,809,747 B1 * 10/2004 Ichioka ................. H04H 60/13
348/E5.098
(Continued)

FOREIGN PATENT DOCUMENTS

CN     105389148    3/2016
WO    2015197825    12/2015

OTHER PUBLICATIONS

CDN Solutions Group Blog; Li-Fi—A Light Based Communication Technology Faster than Wi-Fi; Retrieved from the Internet Jan. 12, 2017; URL: https://www.cdnsol.com/blog/li-fi-light-based-communication-technology/; 2 pages.
(Continued)

*Primary Examiner* — Pankaj Kumar
*Assistant Examiner* — Timothy R Newlin
(74) *Attorney, Agent, or Firm* — Schmeiser, Olsen & Watts; Mark C. Vallone

(57) ABSTRACT

A method and system for improving an interactive video search is provided. The method includes receiving, by a remote control, data including video object based questions. The remote control comprises a memory, a display, and a light fidelity device. The data is stored in the memory. A command associated with the data is received from a user based on video data being presented via a video presentation device and video object based questions are presented. In response, a selection for a question of the video object based questions is received. A light source is enabled such that a light is visible on the video object being presented via the video presentation device. The video object is identified and an Internet based search associated with locating answers to the question is executed. Information associated with the question is presented.

18 Claims, 8 Drawing Sheets

(51) Int. Cl.
*G06F 3/0482* (2013.01)
*H04N 21/4722* (2011.01)

(56) References Cited

U.S. PATENT DOCUMENTS

| | | | | |
|---|---|---|---|---|
| 8,000,972 B2* | 8/2011 | Candelore | ............ | H04N 5/4403 704/231 |
| 8,595,773 B1 | 11/2013 | Wang et al. | | |
| 9,596,508 B2* | 3/2017 | McCoy | ............. | G06K 9/00597 |
| 2006/0125968 A1* | 6/2006 | Yokozawa | ............. | G06F 3/033 348/734 |
| 2007/0113247 A1* | 5/2007 | Kwak | ................ | G06F 3/0481 725/43 |
| 2008/0209480 A1 | 8/2008 | Eide et al. | | |
| 2011/0063206 A1* | 3/2011 | Karaoguz | ............ | G06F 3/0304 345/156 |
| 2011/0067051 A1* | 3/2011 | Karaoguz | ............ | G06F 3/0304 725/34 |
| 2011/0113444 A1 | 5/2011 | Popovich | | |
| 2011/0138416 A1* | 6/2011 | Kang | ................... | G06F 3/0482 725/39 |
| 2012/0176509 A1* | 7/2012 | Aravamudan | ... | H04N 21/41407 348/231.3 |
| 2012/0194429 A1* | 8/2012 | Kwon | .................... | G06F 3/038 345/157 |
| 2012/0227074 A1* | 9/2012 | Hill | .................. | H04N 21/42224 725/61 |
| 2013/0226999 A1* | 8/2013 | Sarieddine | ........ | H04L 29/06047 709/203 |
| 2014/0049693 A1* | 2/2014 | Selim | ..................... | G06F 3/017 348/570 |
| 2014/0237495 A1* | 8/2014 | Jang | ................. | H04N 21/44218 725/12 |
| 2015/0054984 A1* | 2/2015 | Higashikawa | ........... | G09G 5/00 348/231.99 |
| 2015/0066913 A1* | 3/2015 | Funk | .................... | H04N 21/237 707/722 |
| 2017/0017304 A1* | 1/2017 | Kang | .................... | G06F 3/017 |
| 2017/0230712 A1* | 8/2017 | Demerchant | ........ | H04N 21/454 |

OTHER PUBLICATIONS

Time Warner Cable; On-Screen Guide; retrieved from the Internet on Feb. 16, 2017; URL: https://wwwtimewarnercable.com/en/tv/features/on-screen-guide.html; 5 pages.

* cited by examiner

US 10,171,862 B2

INTERACTIVE VIDEO SEARCH AND PRESENTATION

FIELD

The present invention relates generally to a method for enabling an interactive search process with respect to a video presentation device and in particular to a method and associated system for improving an interactive video presentation search via usage of a light fidelity equipped remote control device.

BACKGROUND

Accurately identifying visual data typically includes an inaccurate process with little flexibility. Determining inquiries with respect to visual data may include a complicated process that may be time consuming and require a large amount of resources. Accordingly, there exists a need in the art to overcome at least some of the deficiencies and limitations described herein above.

SUMMARY

A first aspect of the invention provides an interactive video presentation search improvement method comprising: receiving, by a processor of a remote control device configured to control functions for a video presentation device, inquiry data comprising a plurality of video object based questions, wherein the remote control device comprises a memory device, a display device, and a light fidelity (Li-Fi) hardware device comprising circuitry, a transceiver, and a light source device; storing, by the processor, the inquiry data within the memory device; receiving, by the computer processor from a user based on video data being presented via the video presentation device, a command associated with the inquiry data; presenting, by the processor via the display device in response to the command, the plurality of video object based questions; receiving, by the processor in response to the presenting, a selection for a first question of the plurality of video object based questions, the first question associated with a video object of the video data being presented via the video presentation device; enabling, by the processor executing the circuitry, the light source device such that a light is visible on the video object being presented via the video presentation device; identifying, by the processor based on results of the enabling, the video object with respect to the first question; executing, by the processor based on results of the identifying and via the transceiver, an Internet based search associated with locating answers to the first question; and presenting, by the processor to the user based on results of the executing, information associated with the first question with respect to the video object.

A second aspect of the invention provides a computer program product, comprising a computer readable hardware storage device storing a computer readable program code, the computer readable program code comprising an algorithm that when executed by a processor of a remote control device configured to control functions for a video presentation device implements an interactive video presentation search improvement method, the method comprising: receiving, by the processor, inquiry data comprising a plurality of video object based questions, wherein the remote control device comprises a memory device, a display device, and a light fidelity (Li-Fi) hardware device comprising circuitry, a transceiver, and a light source device; storing, by the processor, the inquiry data within the memory device; receiving, by the computer processor from a user based on video data being presented via the video presentation device, a command associated with the inquiry data; presenting, by the processor via the display device in response to the command, the plurality of video object based questions; receiving, by the processor in response to the presenting, a selection for a first question of the plurality of video object based questions, the first question associated with a video object of the video data being presented via the video presentation device; enabling, by the processor executing the circuitry, the light source device such that a light is visible on the video object being presented via the video presentation device; identifying, by the processor based on results of the enabling, the video object with respect to the first question; executing, by the processor based on results of the identifying and via the transceiver, an Internet based search associated with locating answers to the first question; and presenting, by the processor to the user based on results of the executing, information associated with the first question with respect to the video object.

A third aspect of the invention provides a remote control device configured to control functions for a video presentation device and comprising a computer processor coupled to a computer-readable memory unit, the memory unit comprising instructions that when executed by the computer processor implements an interactive video presentation search improvement method comprising: receiving, by the processor, inquiry data comprising a plurality of video object based questions, wherein the remote control device comprises a memory device, a display device, and a light fidelity (Li-Fi) hardware device comprising circuitry, a transceiver, and a light source device; storing, by the processor, the inquiry data within the memory device receiving, by the computer processor from a user based on video data being presented via the video presentation device, a command associated with the inquiry data; presenting, by the processor via the display device in response to the command, the plurality of video object based questions; receiving, by the processor in response to the presenting, a selection for a first question of the plurality of video object based questions, the first question associated with a video object of the video data being presented via the video presentation device; enabling, by the processor executing the circuitry, the light source device such that a light is visible on the video object being presented via the video presentation device; identifying, by the processor based on results of the enabling, the video object with respect to the first question; executing, by the processor based on results of the identifying and via the transceiver, an Internet based search associated with locating answers to the first question; and presenting, by the processor to the user based on results of the executing, information associated with the first question with respect to the video object.

The present invention advantageously provides a simple method and associated system capable of accurately identifying visual data.

DETAILED DESCRIPTION

Figure 1:
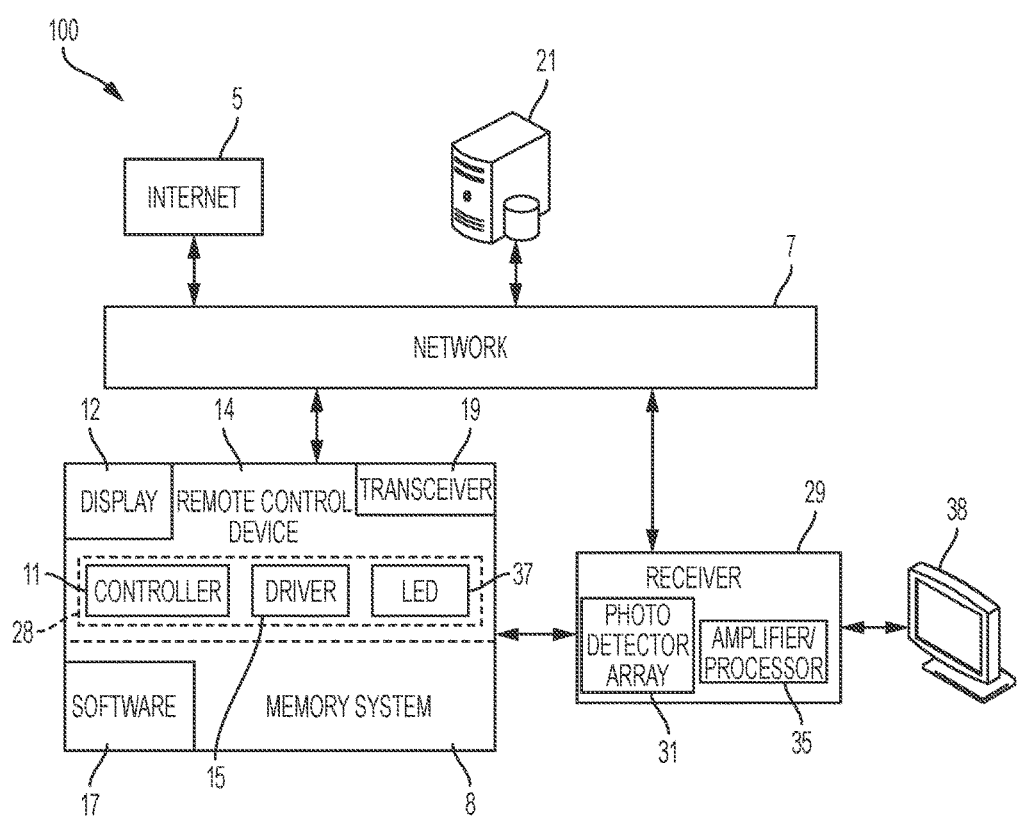
FIG. 1 illustrates a system for improving an interactive video presentation search via usage of a light fidelity (LiFi) equipped remote control device, in accordance with embodiments of the present invention.

FIG. 1 illustrates a system 100 for improving an interactive video presentation search via usage of a light fidelity (LiFi) equipped remote control device 14, in accordance with embodiments of the present invention. LiFi is defined herein as visible light communication (VLC) process for data transmission. LiFi enables an LED system to encode and modulate data messages from the Internet as light output at rapid speeds to a receiving photo detector. The photo detector is configured to convert changes in light intensity to electrical current converted into a binary data stream transmitted to any attached computers and/or mobile devices. System 100 enables enabling users to perform an interactive search via a video presentation device 38 (e.g., a television and associated remote control comprising a Li-Fi system). For example, system 100 enables a user (i.e., watching TV) to locate information associated with a video an object (e.g., automobile) on the TV screen by:
1. Selecting a prerecorded voice file associated with a search question/query stored within a memory of a remote control for the TV.
2. Pointing the remote control (i.e., an LED light beam of the remote control) towards a target video object displayed on TV screen. In response, the remote takes a visual image (i.e., a picture) of the target video object.
3. Transmitting the visual image to the TV via Li-Fi technology (installed within the remote control). In response, the TV recognizes the target video object and overlays additional information (e.g., to display search results) describing the target object on the TV screen.

System 100 of FIG. 1 includes a server 21 and an Internet system 5 connected through a network 7 to a remote control device 14 and a receiver module 29 of a video presentation device 38. Remote control device 14 comprises a display 12, a transceiver 19, a LiFi module 28, and a memory system 8 comprising software 17. LiFi module 28 comprises a controller circuit 11, a driver circuit 15, and a light source 37 (e.g., an LED, a laser LED, etc.). Receiver 29 comprises a photo detector array 31 and an amplifier/processor circuit 35. Remote control device 14 communicates with receiver 29 via LiFi module 28 and photo detector array 31. Remote control device 14 and receiver 29 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, remote control device 14 and receiver 29 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-4. The specialized discrete non-generic analog, digital, and logic based circuitry may include proprietary specially designed components (e.g., a specialized integrated circuit, such as for example an Application Specific Integrated Circuit (ASIC) designed for only implementing an automated process for improving an interactive video presentation search process. Remote control device 14 includes memory system 8 and software 17. The memory system 8 may include a single memory system. Alternatively, the memory system 8 may include a plurality of memory systems. Network 7 may include any type of network including, inter alia, a local area network, (LAN), a wide area network (WAN), the Internet, a wireless network, etc.

System 100 enables photo detector array 31 on a display surface (of video presentation device 38) such that each photo detector (of the array) may be identified uniquely based on a relative position of a photo detector array with respect to the display surface. Therefore, when a Li-Fi transceiver (of remote control device 14) transmits a question to the display surface (i.e., towards a direction of LED light focus), an associated photo detector unit receives the LED light and identifies a visual image object displayed on an associated position of the display surface.

The following steps describe a process for improving an interactive video presentation search via usage of a LiFi equipped remote control device 14:
1. One or more audible questions are prerecorded via remote control device 14. Alternatively, the one or more questions may be entered into remote control device 14 via text input. The questions are stored (in memory system 8 of remote control device 14) and presented to the user via display 12 so that the user may select any of the questions . . . . For example, questions may include: A. What is the price of this?; B. What is his name?; C. Where I can purchase this?; etc.
2. When the user is viewing a video (streaming or a video file) via video presentation device 38 and has any question with respect to any video object presented via video presentation device 38, the user may select an associated prerecorded question or record a new question via remote control device 14.
3. Upon selection of the question, LiFi module 28 is enabled and Li-Fi system LED 15 is directed towards video presentation device 38. Accordingly, a light beam of LED 31 illuminates an associated portion of video presentation device 38. Additionally, data is transmitted to video presentation device 38 via LiFi module 28. If video presentation device 38 comprises a Li-Fi receiving unit, remote control device 14 may comprise a laser (to direct towards video objects on video presentation device 38), a forward facing camera (taking pictures of the video objects illuminated via the laser), and a Li-Fi transmission unit for transmitting the pictures from the forward facing camera. Alternatively, if a mobile device is used instead of remote control device 14, the mobile device may comprise a flash light (to direct towards video objects on video presentation device 38), a forward facing camera (taking pictures of the video objects illuminated via the flashlight), and a Li-Fi transmission unit for transmitting the pictures from the forward facing camera.
4. When a user directs remote control device 14 at a video object with the laser, remote control device 14 automatically takes a picture of the video object and transmits the picture to video presentation device 38 via a Li-Fi signal. In response, video presentation device 38 (i.e., amplifier/processor 35) processes the picture, recognizes the video object, and overlays additional information (retrieved via the Internet) describing the video object on video presentation device 38. Alternatively, an illumination sensor installed within video presentation device 38 identifies additional light sources on a display screen of video presentation device 38 such that when an external light source is detected, a brightness level is determined and based on the brightness level, a selected object is detected. Additionally, one or more cameras installed within video presentation device 38 may track: a position of light and a direction off the light to extrapolate a direction of the light direction with respect to video presentation device 38.

5. A search query is executed with respect to the video (image) object and associated selected question. Results of the search query are analyzed and video object is identified with respect to the search results and the search results are displayed with respect to the selected video object.

FIGS. 2A-2E illustrate a sequence of steps executed by a remote control with respect to a TV, in accordance with embodiments of the present invention.

Figure 2A:
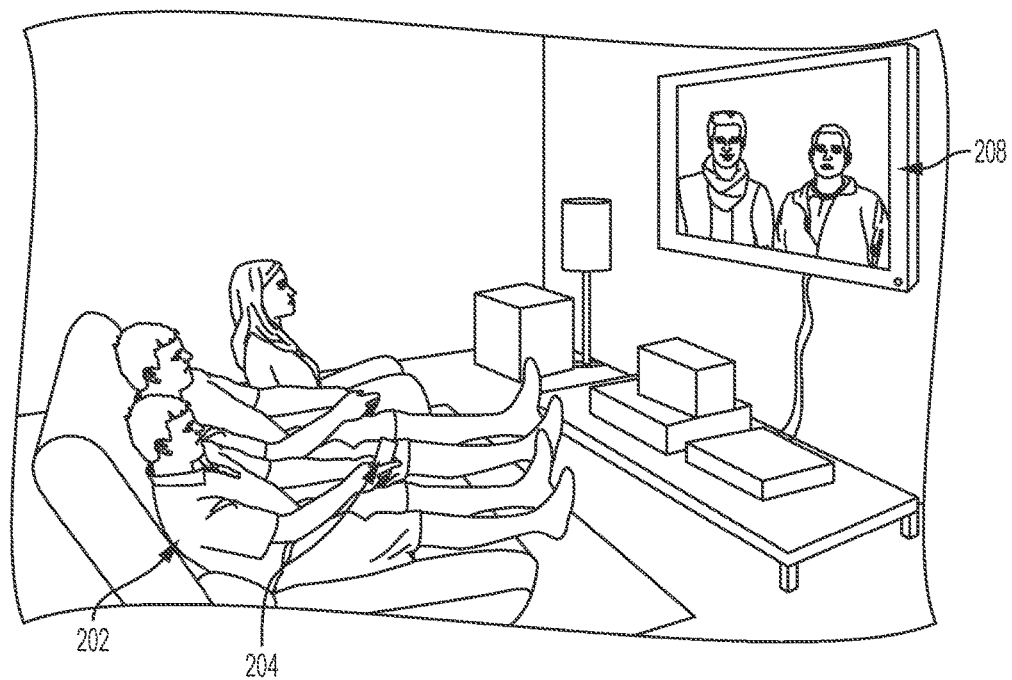
FIGS. 2A-2E illustrate a sequence of steps executed by a remote control with respect to a TV, in accordance with embodiments of the present invention.

FIG. 2A illustrates a user 202 watching a TV 208 and enabling a remote control device 204. The user 202 may have a specific question with respect to a specific frame of a video (e.g., a specific object in the video such as an automobile, furniture, etc.) being presented via the TV 208. For example, question may include, inter alia:
1. What is the brand of this vehicle?
2. What is the price of this vehicle?
3. Are there any discounts available for this vehicle in my area?
4. What are the specifications for this vehicle?

Figure 2B:
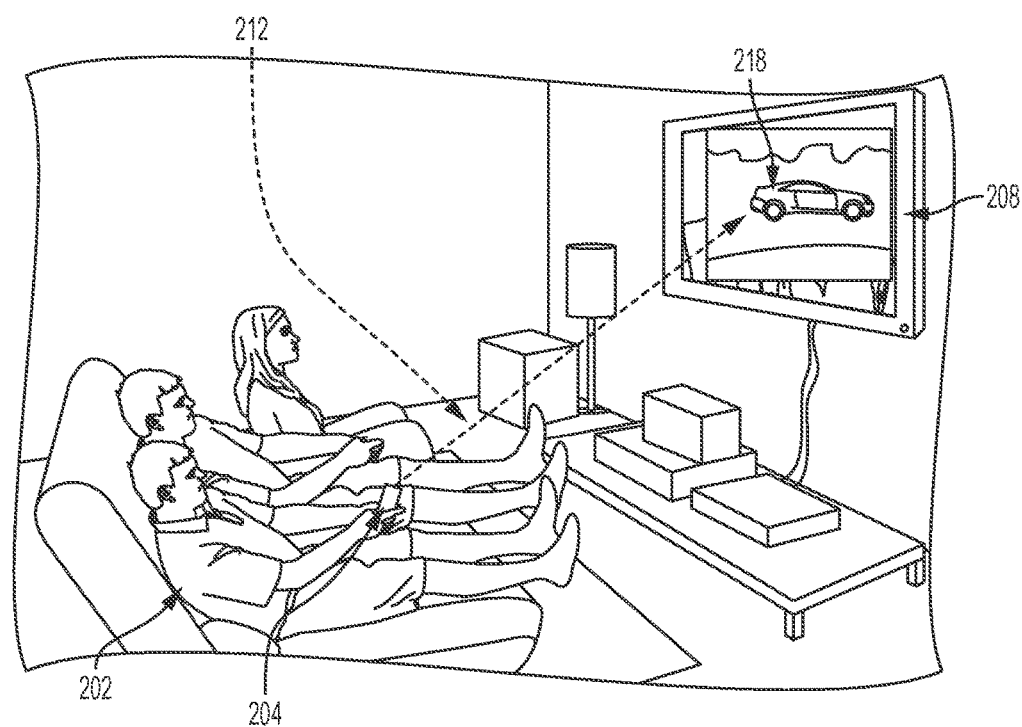

FIG. 2B illustrates user 202 watching TV 208 and enabling remote control device 204 to point remote control device 204 in a direction 212 towards a video object 218 (i.e., an automobile) of interest. In response, a camera of remote control device 204 takes a picture of video object 218. And a specific question is selected via remote control device 204.

Figure 2C:
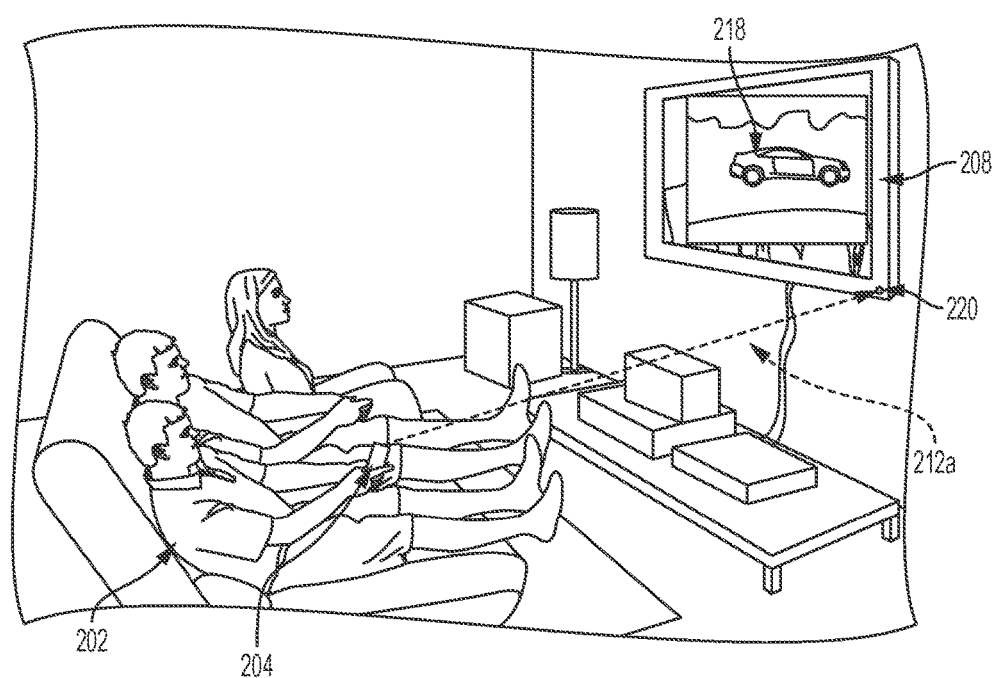

FIG. 2C illustrates user 202 watching TV 208 and enabling remote control device 204 to point remote control device 204 in a direction 212a towards a LiFi receiving circuit 220 in order to transmit the picture of video object 218 and associated question to TV 208.

Figure 2D:
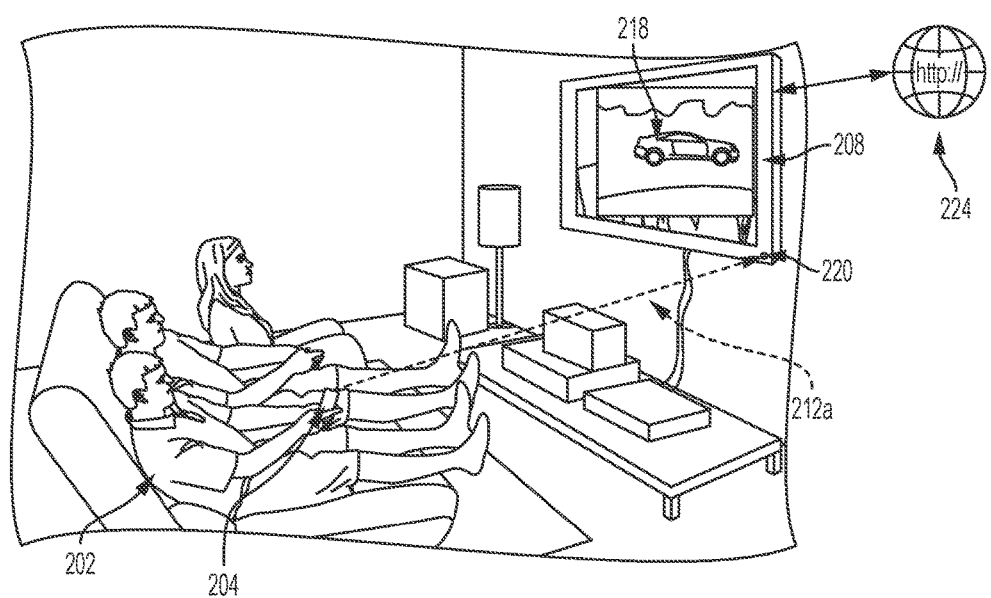

FIG. 2D illustrates TV 208 communicating with the Internet 224 (in response to the process of FIG. 2C) to search for information associated with video object 218 and the associated question.

Figure 2E:
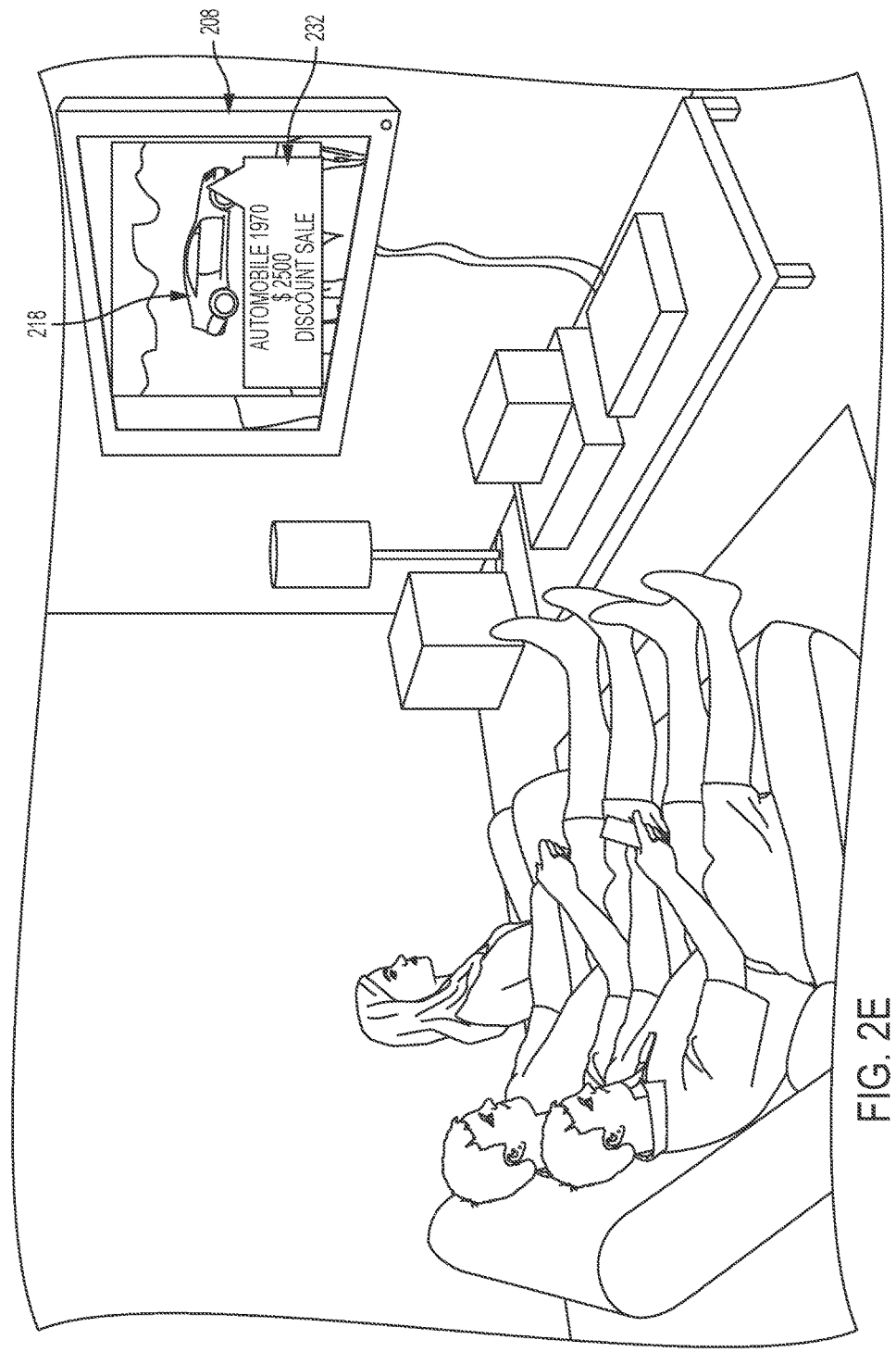

FIG. 2E illustrates TV 208 presenting a description 232 for the information retrieved via the Internet in FIG. 2D.

Figure 3:
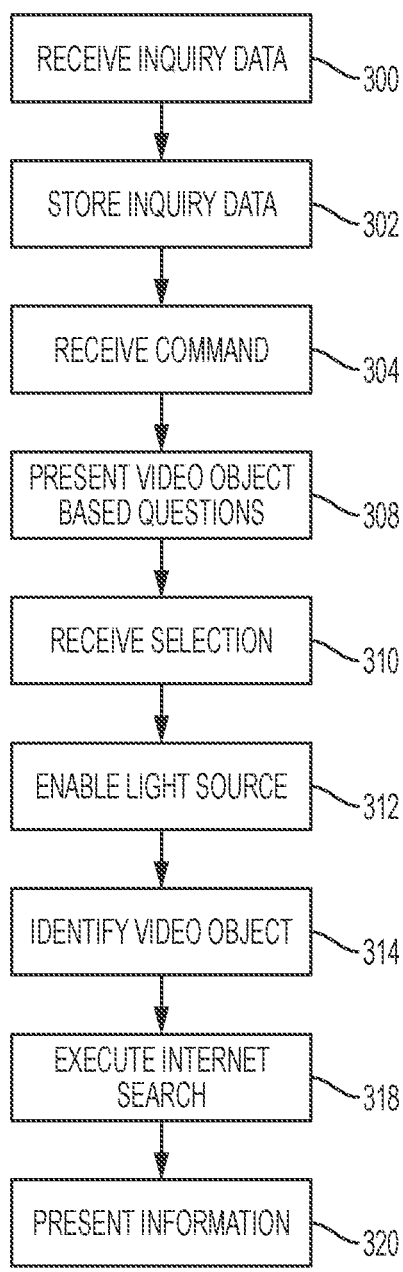
FIG. 3 illustrates an algorithm detailing a process flow enabled by system 100 of FIG. 1 for improving an interactive video presentation search via usage of a LiFi equipped remote control device, in accordance with embodiments of the present invention.

FIG. 3 illustrates an algorithm detailing a process flow enabled by system 100 of FIG. 1 for improving an interactive video presentation search via usage of a LiFi equipped remote control device 14, in accordance with embodiments of the present invention. Each of the steps in the algorithm of FIG. 3 may be enabled and executed in any order by a computer processor(s) executing computer code. Additionally, each of the steps in the algorithm of FIG. 2 may be enabled and executed in combination by remote control device 14 and receiver 29 of FIG. 1. In step 300, inquiry data comprising a plurality of video object based questions is received by a remote control device configured to control functions for a video presentation device. The inquiry data may be received audibly or via a text format. The remote control device includes a memory device, a display device, and a Li-Fi hardware device comprising circuitry, a transceiver, and a light source device. In step 302, the inquiry data within the memory device. In step 304, a command associated with the inquiry data is received by the remote control device from a user based on video data being presented via the video presentation device. In step 308, the plurality of video object based questions are presented to the user via the display device in response to the command. In step 310, a selection for a first question of the plurality of video object based questions is received by the remote control device. The first question is associated with a video object of the video data being presented via the video presentation device. In step 312, the light source device is enabled such that a light is visible on the video object being presented via the video presentation device. In step 314, the video object is identified (in response to step 312) with respect to the first question. Identifying the video object with respect to the first question may include the following optional processes:

1. Retrieving (via a video retrieval device of the remote control device) a visual image of the video object; and transmitting (via the LiFi hardware device to the video presentation device) the visual image such that the video presentation device analyzes the visual image and presents the information adjacent to the video object.
2. Enabling a Li-Fi receiving device and an array of photo detector units integrated with the video presentation device. A photo detector unit of the array of photo detector units identifies (based on a relative position of the photo detector unit) the video object being presented via the video presentation device.
3. Enabling at least one video retrieval device integrated with the video presentation device such that the at least one video retrieval device tracks a position and direction of the light with respect to the light source device. Circuitry of the video presentation device enables step 314 based on the position and direction of the light with respect to the light source device.

In step 320, information associated with the first question is presented with respect to the video object. The information may be presented via the video presentation device or via the display device of the remote control device.

Figure 4:
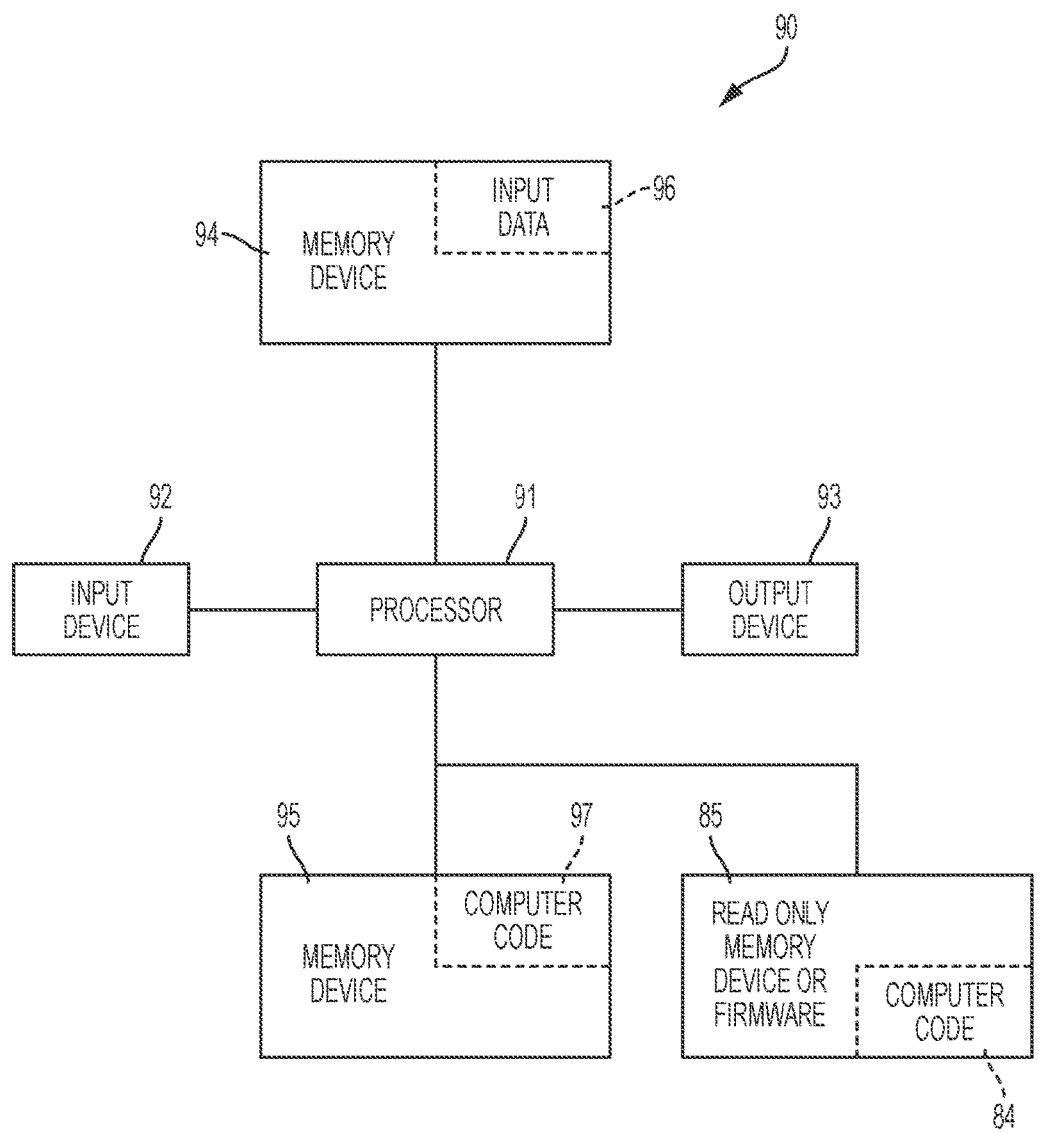
FIG. 4 illustrates a computer system used by the system of FIG. 1 for enabling a process for improving an interactive video presentation search via usage of a LiFi equipped remote control device, in accordance with embodiments of the present invention.

FIG. 4 illustrates a computer system 90 (e.g., remote control device 14 of FIG. 1) used by or comprised by the system of FIG. 1 for improving an interactive video presentation search via usage of a LiFi equipped remote control device, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 3) for improving an interactive video presentation search via usage of a LiFi equipped remote control device. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 3) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve an interactive video presentation search via usage of a LiFi equipped remote control device. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving an interactive video presentation search via usage of a LiFi equipped remote control device. In another embodiment, the invention provides a business method that performs the process steps of the invention on a subscription, advertising, and/or fee basis. That is, a service supplier, such as a Solution Integrator, could offer to enable a process for improving an interactive video presentation search via usage of a LiFi equipped remote control device. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An interactive video presentation search improvement method comprising:
receiving, by a processor of a remote control device configured to control functions for a video presentation device, inquiry data comprising a plurality of video object based questions, wherein said remote control device comprises a memory device, a display device, and a light fidelity (Li-Fi) hardware device comprising circuitry, a transceiver, and a light source device;
storing, by said processor, said inquiry data within said memory device
receiving, by said computer processor from a user based on video data being presented via said video presentation device, a command associated with said inquiry data;
presenting, by said processor via said display device in response to said command, said plurality of video object based questions;
receiving, by said processor in response to said presenting, a selection for a first question of said plurality of video object based questions, said first question associated with a video object of said video data being presented via said video presentation device;
enabling, by said processor executing said circuitry, said light source device such that a light is visible on said video object being presented via said video presentation device;
identifying, by said processor based on results of said enabling, said video object with respect to said first question by:
retrieving via a video retrieval device of said remote control device, a visual image of said video object; and
transmitting via said LiFi hardware device to said video presentation device, said visual image, wherein said video presentation device analyzes said visual image and presents said information adjacent to said video object;
executing, by said processor based on results of said identifying and via said transceiver, an Internet based search associated with locating answers to said first question; and
presenting, by said processor to said user based on results of said executing, information associated with said first question with respect to said video object.

2. The method of claim 1, wherein said identifying said video object with respect to said first question comprises enabling a Li-Fi receiving device and an array of photo detector units integrated with said video presentation device, wherein a photo detector unit of said array of photo detector units identifies, based on a relative position of said photo detector unit, said video object being presented via said video presentation device.

3. The method of claim 1, wherein said identifying said video object with respect to said first question comprises enabling at least one video retrieval device integrated with said video presentation device, wherein said at least one video retrieval device tracks a position and direction of said light with respect to said light source device, and wherein circuitry of said video presentation device enables said identifying based on said position and direction of said light with respect to said light source device.

4. The method of claim 1, wherein said light source device comprises a device selected from the group consisting of a light emitting diode and a laser diode.

5. The method of claim 1, wherein inquiry data is received by said processor via audible means.

6. The method of claim 1, wherein inquiry data is received by said processor via a text file.

7. The method of claim 1, wherein said information associated with said first question with respect to said video object is presented via said video presentation device.

8. The method of claim 1, wherein said information associated with said first question with respect to said video object is presented via said display device of said remote control device.

9. The method of claim 1, further comprising:
providing at least one support service for at least one of creating, integrating, hosting, maintaining, and deploying computer-readable code in the control hardware, said code being executed by the computer processor to implement: said receiving said inquiry data, said storing, said receiving said command, said presenting said plurality of video object based questions, said receiving said selection, said enabling, said identifying, said executing, and said presenting said information.

10. A computer program product, comprising a computer readable hardware storage device storing a computer readable program code, said computer readable program code comprising an algorithm that when executed by a processor of a remote control device configured to control functions for a video presentation device implements an interactive video presentation search improvement method, said method comprising:
receiving, by said processor, inquiry data comprising a plurality of video object based questions, wherein said remote control device comprises a memory device, a display device, and a light fidelity (Li-Fi) hardware device comprising circuitry, a transceiver, and a light source device;
storing, by said processor, said inquiry data within said memory device
receiving, by said computer processor from a user based on video data being presented via said video presentation device, a command associated with said inquiry data;
presenting, by said processor via said display device in response to said command, said plurality of video object based questions;
receiving, by said processor in response to said presenting, a selection for a first question of said plurality of video object based questions, said first question associated with a video object of said video data being presented via said video presentation device;
enabling, by said processor executing said circuitry, said light source device such that a light is visible on said video object being presented via said video presentation device;
identifying, by said processor based on results of said enabling, said video object with respect to said first question by:
retrieving via a video retrieval device of said remote control device, a visual image of said video object; and
transmitting via said LiFi hardware device to said video presentation device, said visual image, wherein said video presentation device analyzes said visual image and presents said information adjacent to said video object;
executing, by said processor based on results of said identifying and via said transceiver, an Internet based search associated with locating answers to said first question; and
presenting, by said processor to said user based on results of said executing, information associated with said first question with respect to said video object.

11. The computer program product of claim 10, wherein said identifying said video object with respect to said first question comprises enabling a Li-Fi receiving device and an array of photo detector units integrated with said video presentation device, wherein a photo detector unit of said array of photo detector units identifies, based on a relative position of said photo detector unit, said video object being presented via said video presentation device.

12. The computer program product of claim 10, wherein said identifying said video object with respect to said first question comprises enabling at least one video retrieval device integrated with said video presentation device, wherein said at least one video retrieval device tracks a position and direction of said light with respect to said light source device, and wherein circuitry of said video presentation device enables said identifying based on said position and direction of said light with respect to said light source device.

13. The computer program product of claim 10, wherein said light source device comprises a device selected from the group consisting of a light emitting diode and a laser diode.

14. The computer program product of claim 10, wherein inquiry data is received by said processor via audible means.

15. The computer program product of claim 10, wherein inquiry data is received by said processor via a text file.

16. The computer program product of claim 10, wherein said information associated with said first question with respect to said video object is presented via said video presentation device.

17. The computer program product of claim 10, wherein said information associated with said first question with respect to said video object is presented via said display device of said remote control device.

18. A remote control device configured to control functions for a video presentation device and comprising a computer processor coupled to a computer-readable memory unit, said memory unit comprising instructions that when executed by the computer processor implements an interactive video presentation search improvement method comprising:
receiving, by said processor, inquiry data comprising a plurality of video object based questions, wherein said remote control device comprises a memory device, a display device, and a light fidelity (Li-Fi) hardware device comprising circuitry, a transceiver, and a light source device;
storing, by said processor, said inquiry data within said memory device
receiving, by said computer processor from a user based on video data being presented via said video presentation device, a command associated with said inquiry data;
presenting, by said processor via said display device in response to said command, said plurality of video object based questions;
receiving, by said processor in response to said presenting, a selection for a first question of said plurality of video object based questions, said first question associated with a video object of said video data being presented via said video presentation device;
enabling, by said processor executing said circuitry, said light source device such that a light is visible on said video object being presented via said video presentation device;
identifying, by said processor based on results of said enabling, said video object with respect to said first question by:
retrieving via a video retrieval device of said remote control device, a visual image of said video object; and transmitting via said LiFi hardware device to said video presentation device, said visual image, wherein said video presentation device analyzes said visual image and presents said information adjacent to said video object;
executing, by said processor based on results of said identifying and via said transceiver, an Internet based search associated with locating answers to said first question; and
presenting, by said processor to said user based on results of said executing, information associated with said first question with respect to said video object.

\* \* \* \* \*